Figure 1:
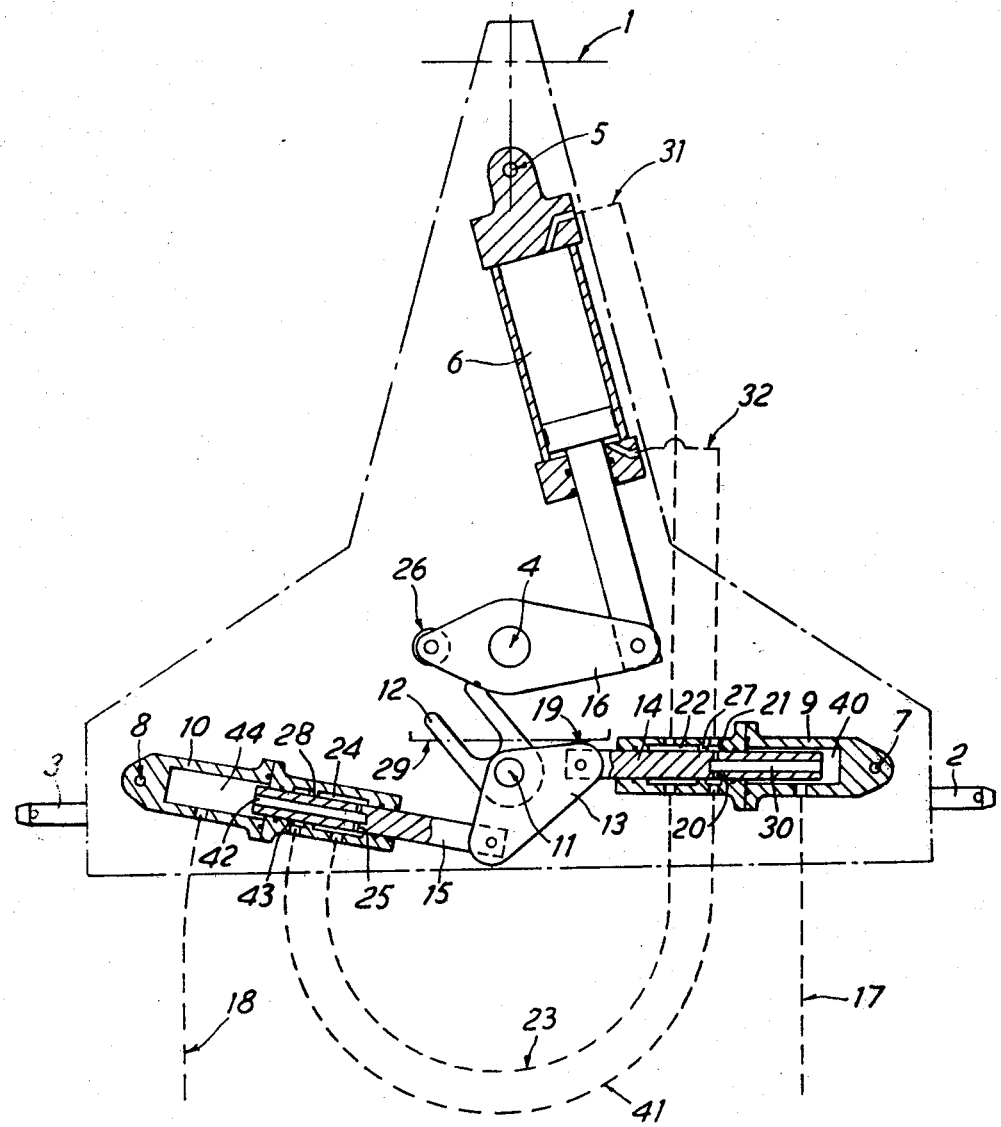

United States Patent [19]

Hawes

[11] 4,273,197

[45] Jun. 16, 1981

[54] REVERSIBLE PLOUGHS

[75] Inventor: Richard J. Hawes, Ipswich, England

[73] Assignee: Nacton Works, Ipswich, England

[21] Appl. No.: 128,900

[22] Filed: Mar. 10, 1980

[30] Foreign Application Priority Data

Mar. 12, 1979 [GB] United Kingdom ............... 08643/79

[51] Int. Cl.³ .............................................. A01B 3/34
[52] U.S. Cl. .................................... 172/225; 172/494
[58] Field of Search ................ 172/225, 226, 227, 494

[56] References Cited

U.S. PATENT DOCUMENTS 4,067,396  1/1978  Watts ................................... 172/225

FOREIGN PATENT DOCUMENTS 1171661  6/1964  Fed. Rep. of Germany ........... 172/225
2382161  11/1978  France ..................................... 172/225

Primary Examiner—George J. Marlo

Attorney, Agent, or Firm—Browdy & Neimark

[57] ABSTRACT

A reversible plough has a double acting hydraulic ram connected between the headstock and the reversing spindle to reverse the plough frame from a left handed to a right handed ploughing position, and vice versa. Hydraulically operating mechanism is provided in the headstock both to switch the flow of hydraulic fluid from one to the other end of the double acting ram and to apply additional reversing torque to the spindle at the midway position. The mechanism comprises two hydraulic cylinders acting upon a fork pivotally mounted in the headstock and engaging with a roller spaced radially of the spindle. As the midway position is approached, the roller displaces the fork from a rest position whereupon the fork is rotated by the cylinders to drive the reversing spindle through the midway position. Internal fluid pathways in the two cylinders effect the change of fluid flow to the double acting ram.

12 Claims, 5 Drawing Figures

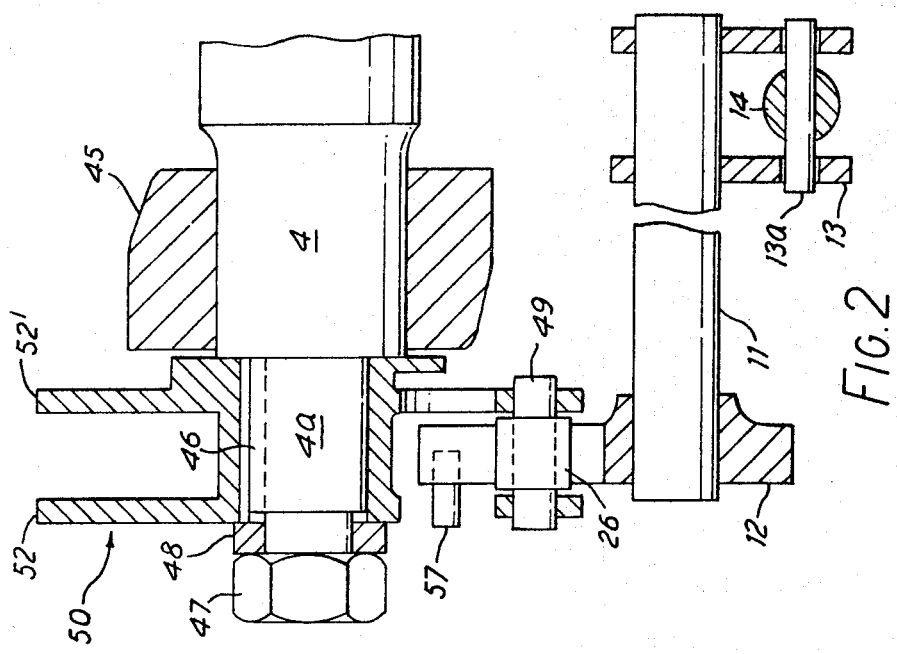
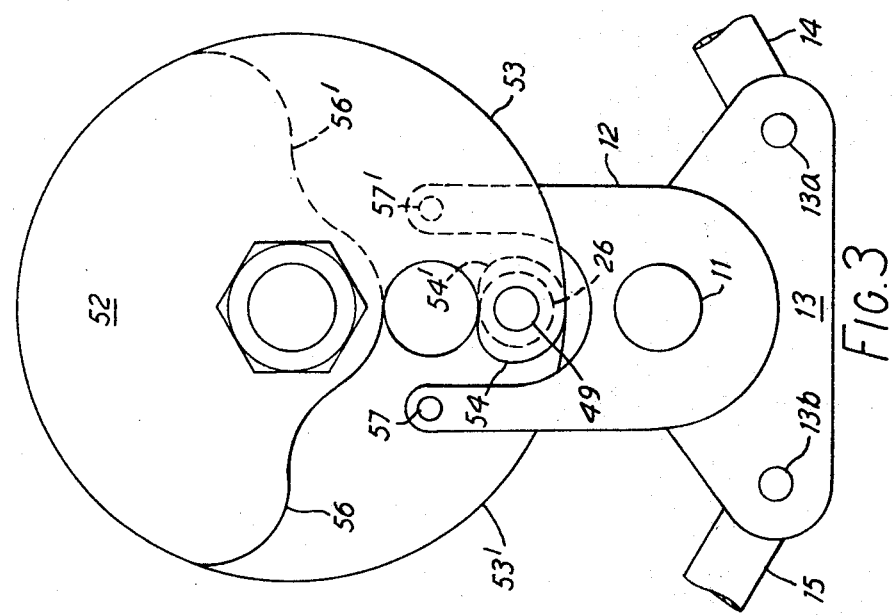

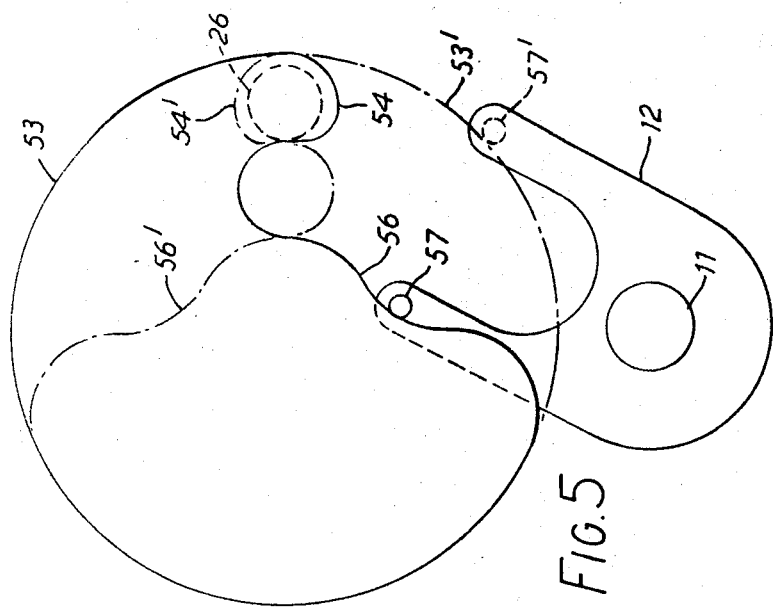
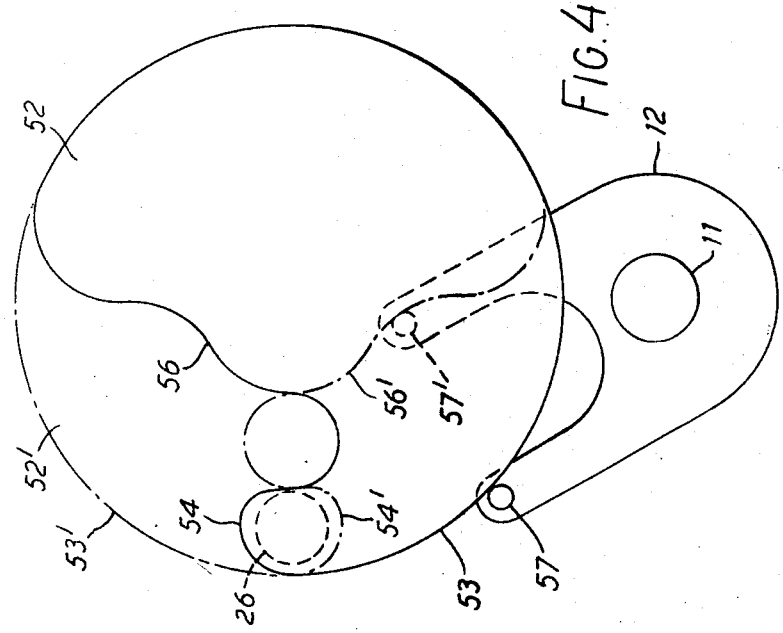

REVERSIBLE PLOUGHS

This invention relates to reversible ploughs and particularly to ploughs in which the frame is reversed by means of a hydraulic ram provided in the headstock.

Usually the hydraulic ram which is employed is of the double acting type. Plough reversing mechanisms using a single acting ram with a spring to retract the ram at the end of the power stroke are known, but these are generally wasteful of space and can normally only operate with small ploughs requiring relatively low reversing torque. With the more widely used double acting rams, there are essentially two ways in which the mechanism can reverse the plough frame. In a first alternative, the ram is connected to the reversing spindle of the plough through a gearing mechanism so that extension of the ram serves to reverse the plough frame from left to right and, in the following reversing movement, contraction of the ram reverses the frame back from right to left. With the second alternative, the double acting ram is connected directly to a crank extending radially of the reversing spindle so that both extending and contracting movements of the ram are required for a single reversal of the plough frame. The ram is first used to bring the plough frame to a midway position and the direction of hydraulic fluid flow is then reversed so that the ram completes the reversing operation with movement in the opposite sense. This alternative therefore involves a "push-pull" (or pull-push) procedure.

The use of a double acting ram in the push-pull mode has two important advantages over the case where a single ram extension or contraction reverses the plough frame. The push-pull arrangement is firstly more compact since it involves a shorter ram stroke and does not require a gear mechanism and, secondly, it requires a less powerful hydraulic ram for the same size of plough. This invention therefore concerns itself with the use of double acting rams in the push-pull mode and relates, in particular, to revesible ploughs comprising a headstock for connection to a tractor and having a reversing spindle rotatably mounted therein; a plough frame secured to the reversing spindle for rotational reversing movement relative to the headstock between left and right handed ploughing positions, the frame being adapted for the mounting of left and right handed plough bodies; and a double acting hydraulic ram supported in the headstock and connected with the reversing spindle, the ram being adapted when supplied with hydraulic fluid at one end thereof to rotate the frame from one ploughing position to a midway position and when subsequently supplied with hydraulic fluid at the other end thereof to rotate the frame from the midway position to the other ploughing position.

The push-pull arrangements used hitherto, and an example is shown as the second described embodiment of West German Auslegeschrift No. 1,171,661, have suffered from the defect that at the midway position, where the ram is switching from contraction to extension or vice versa, there is no driving torque on the reversing spindle. The plough frame relies upon its own momentum to pass through the midway position and in these circumstances, there is a risk of the plough frame coming to a complete halt if soil has accumulated on one side of the plough or if the plough touches the ground during reversal. Once the plough frame has come to a halt it is usually very difficult to complete the reversal procedure. It is of course also necessary in these arrangements to provide some means of switching the flow of hydraulic fluid from one end of the double acting ram to the other at the midway position.

It is an object of this invention to provide a reversible plough which has the described advantages of a push-pull or pull-push arrangement, but in which the risk of the plough frame coming to a halt at the midway position is significantly reduced.

Accordingly, reversible ploughs according to the present invention are characterised in that there is provided a hydraulically operating mechanism connected between a source of hydraulic fluid and the double acting ram and cooperating mechanically with the reversing spindle, the mechanism serving at the midway position of the plough frame both to switch the flow of hydraulic fluid from one to the other end of the double acting ram and to apply additional reversing torque to the spindle. Since it is essential to have some means for switching the flow of hydraulic fluid at the midway position, the present invention succeeds—by providing an ingenious mechanism which not only performs this task but also applies additional reversing torque—in overcoming the described disadvantages without taking up significantly more space and without requiring an excessively complicated mechanical arrangement.

Advantageously, the mechanism includes hydraulic piston and cylinder means serving through extending or retracting movement thereof to apply additional reversing torque to the spindle, the piston and cylinder means having ports connected through hydraulic conduit respectively with opposite ends of the double acting ram and with the source of hydraulic fluid and having internal fluid path-ways communicating between said ports to connect the source with one end of the double acting ram in an extended position of the piston and cylinder means and with the other end of the double acting ram in a retracted position of the piston and cylinder means.

Suitably, the hydraulically operating mechanism further comprises a first coupling element mounted in the headstock so as to be movable relative thereto under the action of the piston and cylinder means between two rest positions, the first coupling element being normally held in a rest position, and a second coupling element carried on the reversing spindle and so cooperating with the first coupling element as to displace it from a rest position as the reversing spindle approaches the midway position, mutual engagement of the two coupling elements thereafter serving to drive the reversing spindle through the midway position as the first coupling element is moved to its other rest position under the action of the piston and cylinder means.

It is a preferred feature of the invention that the hydraulically operating mechanism has rest positions associated respectively with the ploughing positions of the frame and is adapted, if displaced from one such rest position, to move under hydraulic power to the other rest position, the reversing spindle being arranged as the midway position is approached to displace the mechanism from a rest position, consequential movement of the mechanism to its other rest position then driving the reversing spindle through the midway position.

The invention will now be described by way of example with reference to the accompanying drawings in which:

FIG. 1 is a diagrammatic representation of the headstock of a reversible plough according to this invention, FIG. 2 is a part sectional view of a further headstock according to this invention, showing a modification and having certain parts omitted for the sake of clarity, FIG. 3 is an end view of FIG. 2, again with certain parts omitted for the sake of clarity and FIGS. 4 and 5 are diagrammatic views generally similar to FIG. 3 but showing parts in different stages of the reversing procedure.

Referring to FIG. 1, the plough headstock is provided with a top link pin at 1 and bottom link pins 2 and 3 for attachment to the tractor linkage. The construction of the headstock may take any desired form and a typical outline is shown in chain dot lines on the drawing. A reversing spindle 4 is mounted on bearings in the plough headstock and it is to this spindle that the plough frame (not shown) is rigidly secured. The plough frame is arranged to carry sets of left and right handed plough bodies and may again take any convenient form. A double acting hydraulic ram 6 is pendently supported in the headstock at 5 and at its other end is pinned to an arm 16 rigidly secured to the reversing spindle 4.

Two auxiliary hydraulic cylinders 9 and 10 are pivotally mounted in the headstock by means of pins 7 and 8 at their respective outer ends. These two cylinders extend generally inwardly of the headstock and their respective pistons 14 and 15 are pinned at spaced locations to a substantially triangular plate 13. This plate 13 is pivotally mounted about an axis 11 parallel with the axis of the reversing spindle and there is provided integrally with the plate 13 a fork 12 which is arranged to cooperate with a roller 26 carried on the arm 16 at a location diametrically opposed to the connection to the plate 16 of the ram 6. The two cylinders are identical in construction and only cylinder 9 will be described in detail. To the right of piston 14 (as seen in the drawing) a chamber 40 is defined within cylinder 9, this chamber communicating with a conduit 17 for connection to the hydraulic fluid supply of a tractor. The piston 14 has an axial bore 30 extending from chamber 40 along approximately half the length of the piston. The innermost end of the bore 30 connects with a cross drilled hole 20 in the piston, this cross drilled hole 20 communicating with either, depending upon the position of the piston 14 relative to the cylinder 9, of two annular chambers 21 and 22 in the cylinder 9 separated by land 27. The chamber 21 connects with a conduit 32 leading to the lower end of double acting ram 6 and with a conduit 41 which leads to the corresponding annular chamber 43 in cylinder 10. Similarly, the chamber 22 is connected through conduit 31 with the upper end of the ram 6 and through conduit 23 with the corresponding chamber 24 of cylinder 10.

The manner in which the described mechanism operates can now be understood. To initiate the reversing procedure the tractor hydraulic controls are operated to pressurise line 17. The chamber 40 is accordingly pressurised, tending to force piston 14 to the left (as seen in the drawing). The connection of the piston 14 to plate 13 is however slightly above the centre line of pivot points 11 and 7 so that a force is applied to plate 13 tending to rotate it anti-clockwise against an abutment 19 secured in the headstock. There is therefore at this stage no movement of piston 14. Hydraulic fluid is conducted along bore 30 and across drilled hole 20 to the annular chamber 21 and thus through conduit 32 to the lower end of the ram, which begins to contract. There is no significant flow of fluid along conduit 41 since the corresponding chamber 43 in the piston 10 is at this point in the procedure closed. As the ram 6 contracts fluid is expelled from the top of the cylinder and conducted through conduit 31 to annular chamber 22 of the cylinder 10. This chamber is in communication with the corresponding chamber 24 of the cylinder 10 and the expelled fluid is accordingly conducted through this chamber 24 to the cross drilled hole 25 and bore 42 to the chamber 44. This chamber 44 is connected to the tractor fluid return line 18.

The contraction of the ram 6 serves through arm 16 to rotate the reversing spindle 4 anti-clockwise (as seen in the drawing). When the reversing spindle and plough frame are approximately 35° from the midway position, the roller 26 enters the fork 12 and begins to rotate the unitary structure of fork 12 and plate 13 clockwise about the pivot axis 11. This rotational movement is initially opposed by the pressurised fluid in chamber 40 acting on piston 14, but this opposing force is very small in comparison with the force provided by ram 6 at this stage in the reversal. After fork 12 and plate 13 have been rotated a few degrees, the point of connection of piston 14 to the plate 13 moves below the centre line of pivot points 7 and 11 so that the turning movement about axis 11 applied by the piston 14 has changed direction. Under the pressure of fluid in chamber 40 the piston 14 is forced outwardly of cylinder 9 thus driving plate 13 clock-wise and—through the engagement of roller 26 and fork 12—applying an additional reversing torque to the spindle 4. Since the perpendicular distance between axis 11 and the line of action of piston 14 increases as the midway position is approached, the additional torque applied to the reversing spindle 4 increases, thus compensating for the decrease to zero of the reversing torque applied by the double acting ram 6.

At the midway position, the cross drilled hole 20 in piston 14 passes over land 27 in cylinder 9 and at the same time the cross drilled hole 25 of piston 15 (which is moving to the left as seen in the drawing) crosses land 28 of cylinder 10. In the new positions, pressurised chamber 40 is connected through bore 30 and cross drilled hole 20 with annular chamber 22 so that pressurised fluid is supplied to the top of the ram which will accordingly begin to extend. Expelled fluid from the bottom of the ram 6 is conducted through conduit 32 to the now closed chamber 21 and hence via conduit 41 to the corresponding chamber 43 in cylinder 10. This chamber 43 is now connected through cross drilled hole 25 and bore 42 to the chamber 44 and tractor return line 18. The fork 12 and plate 13 continue to rotate with the main spindle for approximately 35° after the midway position, at which point the plate 13 engages an abutment 29 in the headstock. Rotation of the reversing spindle then continues under drive from the double acting ram 6 alone, until the plough has fully reversed.

When it is next required to reverse the plough, the tractor hydraulic controls are actuated to pressurise line 18 with line 17 serving as the fluid return. The reversal procedure is then analogous with that described, the function of the two cylinders 9 and 10 being interchanged.

In order to limit the speed at which the plough frame is reversed, flow restrictors can be inserted in the conduits 31 and 32. In addition a lock valve can be provided in conduit 31 to hold the plough frame on its limit stops by preventing the escape of fluid from the top of the ram. This lock valve would be pilot-operated from the bottom of the ram so that flow out of the top of the ram could occur if pressure were applied to the bottom of the ram for reversal.

It will be appreciated that the piston and cylinder means 9, 14 and 10, 15 of FIG. 1 together with the unitary structure of fork 12 and plate 13 cooperating with roller 26, constitutes a hydraulically operating mechanism which, at the midway position of the plough frame, not only switches the flow of hydraulic fluid from one to the other end of the double acting ram 6, but also applies additional reversing torque to the spindle 4.

A modified arrangement will now be described with reference to FIGS. 2, 3, 4 and 5 and in these figures parts which are common to FIG. 1 are given the same reference numerals as in FIG. 1.

Referring to FIGS. 2 and 3, the reversing spindle 4 is rotatably mounted in the headstock by means which include bearing 45. A portion 4a of the reversing spindle of reduced diameter extends forwardly from the bearing 45 and has cut into it a keyway 46. A cam assembly shown generally at 50 is mounted on spindle portion 4a and is secured for rotation with the reversing spindle by means of a key cooperating in keyway 46, a nut 47 and a washer 48. The cam assembly 50 comprises parallel leaves 52 and 52' which are approximately kidney shaped. Each cam leaf is formed with a generally circular cam surface 53, 53' which extends over approximately 270° of the circumference. Each cam surface 53, 53' terminates in a respective cam nose 54, 54' and the periphery of each cam leaf is completed by an irregularly formed cam surface 56, 56'. It will be seen that the two cam noses 54, 54' are arranged to project in opposite directions and between them they support the roller 26 carried on pin 49.

Fork 12 is disposed generally between the two cam leaves 52, 52' and is secured by for example a keyway and set screw, (not shown) to the shaft 11. The two limbs of fork 12 are each provided with a pin 57, 57'; these pins extending in opposite directions to cooperate respectively with the cam leaves. At the end of shaft 11 remote from the fork 12, a pair of generally triangular plates 13 are provided having extending therebetween two pins 13a and 13b. The free end of piston 14 is secured to pin 13a and the free end of piston 15 is secured to pin 13b.

The cam assembly 50 is shown in FIGS. 2 and 3 in the midway position; FIG. 4 shows the configuration when the plough frame is in the left hand ploughing position and FIG. 5 shows the configuration when—after reversal—the plough frame is in the right hand ploughing position. For clarity, the outline of cam leaf 52' is shown in FIGS. 4 and 5 in chain dot outline so enabling the two cam leaves to be distinguished.

At the beginning of reversal, in the position shown in FIG. 4, the cam noses 54 and 54' together with the roller 26 which extends between them, are positioned at nine o'clock and the fork 12 is inclined to the left. In this position, the fork pin 57 will be in contact with the circular cam surface 53 effectively preventing rocking movement of the fork. Pin 57' will in this position be cooperating with the irregular cam surface 56' of cam leaf 52'. As the reversing spindle 4 and consequently camm assembly 50, is rotated by the main hydraulic ram 6, pin 57 will slide along surface 53 until, shortly before the midway position is reached, the pin 57 reaches nose 54. The fork 12 is then no longer held and is able to rock from left to right as piston rod 14 extends. During this rocking movement, the fork 12 engages roller 26 to drive the reversing spindle through the midway position as described above. As the rocking movement is completed, pin 57' is engaged by nose 54' and with extension of the ram completing the reversing movement, pin 57' slides along cam surface 53' until the position shown in FIG. 4 is reached. During reversal in the opposite sense the operation of cam assembly 50 is analogous to that described above with the function of cam leaves 52 and 52' being interchanged.

The modification shown in FIGS. 2 to 5 is preferred because the use of a cam to prevent premature rotation of the fork 12 is more reliable than the over centre arrangement shown in FIG. 1.

This invention has been described by way of examples only and a great variety of modifications are possible without departing from the scope of the invention as claimed. Thus for example the described pair of auxiliary cylinders and pistons could be replaced by other suitable cylinder and piston means such a single auxiliary piston and cylinder. These described cylinders 9 and 10 could be fashioned with internal fluid pathways different from those described to connect the source of hydraulic fluid with the appropriate end of the main hydraulic ram. The manner in which the hydraulically operating mechanism cooperates with the reversing spindle, that is to say by means of a fork and roller arrangement, is felt to be particularly advantageous but other forms of coupling are possible.

I claim:

1. A reversible plough comprising a headstock for connection to a tractor and having a reversing spindle rotatably mounted therein; a plough frame secured to the reversing spindle for rotational reversing movement relative to the headstock between left and right handed ploughing positions, the frame being adapted for the mounting of left and right handed plough bodies, and a double acting hydraulic ram supported in the headstock and connected with the reversing spindle, the ram being adapted when supplied with hydraulic fluid at one end thereof to rotate the frame from one ploughing position to a midway position and when subsequently supplied with hydraulic fluid at the other end thereof to rotate the frame from the midway position to the other ploughing position, characterised in that there is provided a hydraulically operating mechanism (9, 10, 14, 15, 13, 12, 26) connected between a source of hydraulic fluid (17, 18) and the double acting ram (16) and cooperating mechanically with the reversing spindle (4), the mechanism serving at the midway position of the plough frame both to switch the flow of hydraulic fluid from one to the other end of the double acting ram and to apply additional reversing torque to the spindle.

2. A reversible plough according to claim 1, characterised in that the mechanism includes hydraulic piston and cylinder means (9, 10, 14 15) serving through extending or retracting movement thereof to apply additional reversing torque to the spindle (4), the piston and cylinder means having ports connected through hydraulic conduit respectively with opposite ends of the double acting ram (6) and with the source of hydraulic fluid (17, 18) and having internal fluid pathways communicating between said ports to connect the source with one end of the double acting ram in an extended position of the piston and cylinder means and with the other end of the double acting ram in a retracted position of the piston and cylinder means.

3. A reversible plough according to claim 2, characterised in that the hydraulically operating mechanism further comprises a first coupling element (12, 13) mounted in the headstock so as to be movable relative thereto under the action of the piston and cylinder means between two rest positions, the first coupling element being normally held in a rest position, and a second coupling element (26) carried on the reversing spindle and so cooperating with the first coupling element as to displace it from a rest position as the reversing spindle approaches the midway position, mutual engagement of the two coupling elements thereafter serving to drive the reversing spindle through the midway position as the first coupling element is moved to its other rest position under the action of the piston and cylinder means.

4. A reversible plough according to claim 3, characterised in that the hydraulic piston and cylinder means comprises a pair of hydraulic cylinders (9, 10) with associated pistons (14, 15), each cylinder and associated piston being connected between the headstock and the first coupling element (12, 13) so that extension of the respective piston moves said element in respective opposite senses.

5. A reversible plough according to claim 3 or claim 4, characterised in that the first coupling element comprises a fork (12) pivotally mounted in the headstock and the second coupling element comprises a roller (26) which is parallel to and spaced radially from the reversing spindle.

6. A reversible pough according to claim 5, characterised in that the second coupling element comprises a pair of spaced cam plates (52, 52') extending radially of the reversing spindle and having the roller rotatably mounted therebetween with said fork being provided with two guide pins (57, 57') extending in opposite directions and cooperating with the peripheries (53, 54, 56, 53', 54', 56') of the respective cam plates, wherein the two cam plates are so shaped that engagement of one guide pin with the associated cam plate holds the fork (12)) in an extreme angular position in each ploughing position of the frame, the shape of the cam plates permitting rocking movement of the fork immediately before the midway position is reached.

7. A reversible plough according to claim 5, characterized in that the second coupling element comprises cam means (50) cooperating with the first coupling element otherwise than at the midway position to hold the first coupling element in a rest position.

8. A reversible plough according to claim 5, characterized in that the piston and cylinder means is adapted to hold the first coupling element in a rest position, said displacement of the first coupling element from a rest position by the second coupling element serving to drive the piston and cylinder means over-centre.

9. A reversible plough according to claim 3 or claim 4, characterised in that the second coupling element comprises cam means (50) cooperating with the first coupling element otherwise than at the midway position to hold the first coupling element in a rest position.

10. A reversible plough according to claim 3 or claim 4, characterised in that the piston and cylinder means is adapted to hold the first coupling element in a rest position, said displacement of the first coupling element from a rest position by the second coupling element serving to drive the piston and cylinder means over-centre.

11. A reversible plough according to claim 1, characterised in that the hydraulically operating mechanism has rest positions associated respectively with the ploughing positions of the frame and is adapted if displaced from one rest position to move with a hydraulic power stroke to the other rest position, the reversing spindle being arranged as the midway position is approached to displace the mechanism from a rest position, consequential movement of the mechanism to its other rest position then driving the reversing spindle through the midway position.

12. A reversible plough according to claim 11, wherein the mechanical coupling of said mechanism with the reversing spindle is so arranged that the torque applied to the reversing spindle during said power stroke of the mechanism increases to a maximum at the exact midway position.

* * * * *